United States Patent
Oszwald et al.

(10) Patent No.: US 10,136,105 B2
(45) Date of Patent: Nov. 20, 2018

(54) VEHICLE DRIVER INFORMATION METHOD

(75) Inventors: Florian Oszwald, Munich (DE); Renaud Debon, Munich (DE); Thomas Barmeyer, Munich (DE); Marc Walessa, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 96 days.

(21) Appl. No.: 13/451,741

(22) Filed: Apr. 20, 2012

(65) Prior Publication Data

US 2012/0212614 A1    Aug. 23, 2012

Related U.S. Application Data

(63) Continuation of application No. PCT/EP2010/005653, filed on Sep. 15, 2010.

(30) Foreign Application Priority Data

Oct. 23, 2009   (DE) .................. 10 2009 050 519

(51) Int. Cl.
    *H04N 7/18*    (2006.01)
    *B60R 1/00*    (2006.01)

(52) U.S. Cl.
    CPC ............... *H04N 7/181* (2013.01); *B60R 1/00* (2013.01); *B60R 2300/105* (2013.01);
    (Continued)

(58) Field of Classification Search
    CPC ............... B60R 1/00; B60R 2300/105; B60R 2300/301; H04N 7/181
    (Continued)

(56) References Cited

U.S. PATENT DOCUMENTS

| 6,923,080 B1 | 8/2005 | Dobler et al. |
| 2001/0028393 A1* | 10/2001 | Tomida ............. B60R 1/00 348/207.99 |

(Continued)

FOREIGN PATENT DOCUMENTS

| DE | 103 15 047 A1 | 10/2004 |
| DE | 10 2006 008 703 A1 | 9/2006 |

(Continued)

OTHER PUBLICATIONS

International Preliminary Report on Patentability with Written Opinion dated Jun. 14, 2012 (nine (9) pages).

(Continued)

*Primary Examiner* — On S Mung
(74) *Attorney, Agent, or Firm* — Crowell & Moring LLP

(57) ABSTRACT

A driver information method is provided, wherein an image of the surrounding area is captured by at least one side camera attached to the motor vehicle. The image contains an image capturing area that lies essentially laterally relative to the motor vehicle. A display unit, which is visible to the driver of a motor vehicle, outputs a screen image that contains a reproduction of the image of the surrounding area, the reproduction being graphically processed, if desired, and being preferably in essence photo-realistic. The output of the screen image is only temporary; and an obstructed view situation, in which an obstructed lateral view of the driver is to be assumed, is detected on the basis of distance signals of at least one environment detection system that is not based on a camera. The output of the screen image is automatically started when an obstructed view situation is detected.

19 Claims, 1 Drawing Sheet

(52) U.S. Cl.
CPC ... *B60R 2300/301* (2013.01); *B60R 2300/302* (2013.01); *B60R 2300/70* (2013.01); *B60R 2300/802* (2013.01)

(58) Field of Classification Search
USPC ............... 348/143, 148, 149, 156, 159, 169
See application file for complete search history.

(56) References Cited

U.S. PATENT DOCUMENTS

| | | | | |
|---|---|---|---|---|
| 2004/0148057 | A1* | 7/2004 | Breed | B60Q 9/008 700/242 |
| 2005/0004761 | A1* | 1/2005 | Takahama et al. | 701/301 |
| 2006/0119472 | A1 | 6/2006 | Tsuboi | |
| 2006/0125919 | A1 | 6/2006 | Camilleri et al. | |
| 2006/0210114 | A1 | 9/2006 | Oka et al. | |
| 2007/0046450 | A1* | 3/2007 | Iwama | 340/436 |
| 2007/0057816 | A1 | 3/2007 | Sakakibara et al. | |
| 2007/0182528 | A1* | 8/2007 | Breed et al. | 340/435 |
| 2008/0198226 | A1 | 8/2008 | Imamura | |
| 2008/0291000 | A1* | 11/2008 | Kim | B60Q 9/008 340/436 |
| 2008/0300755 | A1 | 12/2008 | Madau et al. | |
| 2009/0058677 | A1* | 3/2009 | Tseng | G08C 17/02 340/904 |
| 2009/0069974 | A1* | 3/2009 | Kawase et al. | 701/36 |
| 2009/0079553 | A1* | 3/2009 | Yanagi | B60R 1/00 340/435 |
| 2009/0153664 | A1* | 6/2009 | Higuchi et al. | 348/148 |
| 2010/0201816 | A1* | 8/2010 | Lee et al. | 348/148 |
| 2010/0231715 | A1* | 9/2010 | Garner | 348/148 |
| 2011/0018699 | A1* | 1/2011 | Chen | B60Q 9/008 340/435 |

FOREIGN PATENT DOCUMENTS

| | | |
|---|---|---|
| DE | 10 2007 024 752 A1 | 11/2008 |
| DE | 10 2008 001 991 A1 | 1/2009 |
| EP | 1 760 489 A1 | 3/2007 |
| EP | 1 842 726 A1 | 10/2007 |
| WO | WO 02/09433 A1 | 1/2002 |

OTHER PUBLICATIONS

German Search Report dated Jul. 7, 2010 with partial English translation (nine (9) pages).
International Search Report dated Feb. 3, 2011 with English translation (six (6) pages).
Chinese Office Action issued in Chinese counterpart application No. 201610997269.0 dated Jun. 26, 2018, with English translation (Thirteen (13) pages).

* cited by examiner

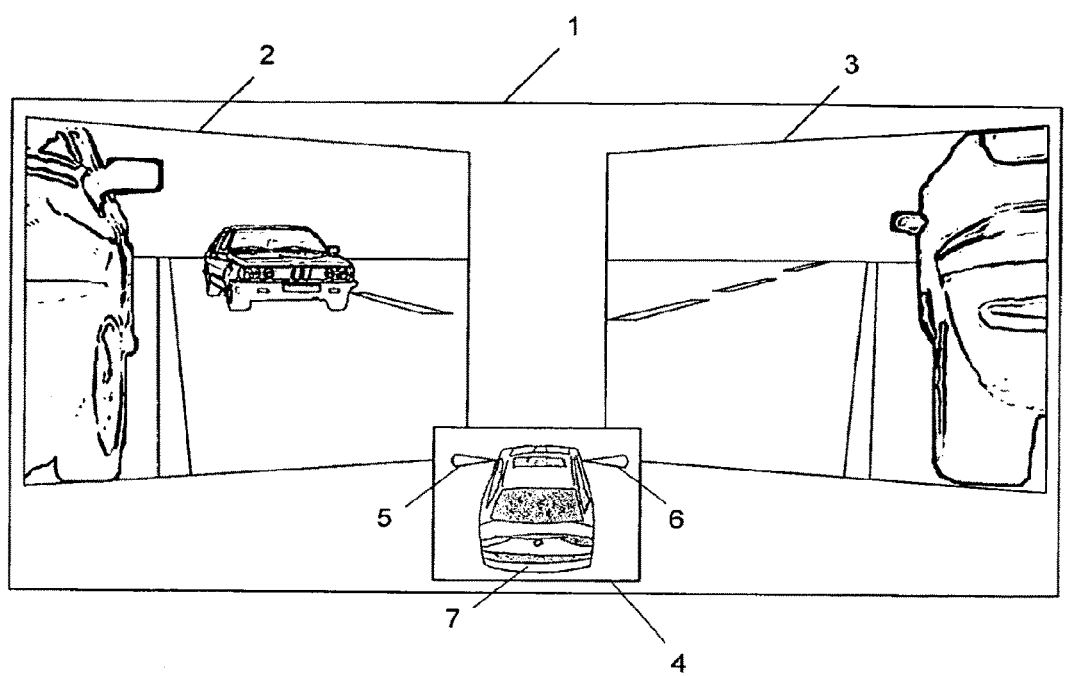

VEHICLE DRIVER INFORMATION METHOD

CROSS-REFERENCE TO RELATED APPLICATIONS

This application is a continuation of PCT International Application No. PCT/EP2010/005653, filed Sep. 15, 2010, which claims priority under 35 U.S.C. § 119 from German Patent Application No. DE 10 2009 050 519.9, filed Oct. 23, 2009, the entire disclosures of which are herein expressly incorporated by reference.

BACKGROUND AND SUMMARY OF THE INVENTION

The invention relates to a driver information method in a motor vehicle, wherein an image of the surrounding area is captured by at least one side camera attached to the motor vehicle. The image contains an image capturing area that lies essentially laterally relative to the motor vehicle. A display unit, which is visible to the driver of a motor vehicle, outputs a screen image that contains a reproduction of the image of the surrounding area. The reproduction is graphically processed, if desired, and is preferably in essence photo-realistic.

Such a method is known, for example, from DE 10 2007 024 752 A1.

Such a method is also based on the parking garage exit camera system, which is commercially available for motor vehicles of the assignee of the present invention under the name "side view." Such a parking garage exit camera system can comprise, for example, a camera (then preferably combined with a prism and/or wide angle optics) or two cameras, which capture a lateral image capturing area from an image capturing position, which is located very far forward on the vehicle—for example, on the front bumper or in the front area of a front fender. The cameras or, more specifically, their main image capturing direction can be oriented, for example, in essence perpendicular to the direction of travel. The camera-based capturing of a lateral image and its display to the driver provides the driver with an enhanced overview of the traffic—for example, at parking garage exits having a blind spot—that is available, in particular, at an earlier stage.

For the sake of a short and concise expression, the term "side view system" is used below. In this context a side view system shall be deemed to be any system that lends itself well to carrying out a method conforming to its genre—that is, any system that captures, based on a camera, an image of the surrounding area, wherein the image contains an image capturing area that lies in essence laterally relative to the motor vehicle. Furthermore, the system has a display unit, for example, a central information display (CID), which is visible to the driver of the motor vehicle and which outputs a screen image that contains a reproduction of the image of the surrounding area. The reproduction is graphically processed, if desired, and is preferably in essence photo-realistic.

The new generation of side view systems already offers its users a significant enhancement in comfort and ease as well as safety. Yet some users still do not resort to the assistance of such a side view system in every suitable situation. For example, some users balk at the time-consuming effort of a key stroke to activate the system. At the same time, a permanent activation is usually undesirable.

DE 103 15 047 A1 discloses methods for automatically controlling vehicle functions as a function of a position history and/or map data. However, these methods cannot be transferred to the complex problem of a side view system.

The object of the present invention is to increase the practical use of a driver information method of the above-mentioned type.

This and other objects are achieved by a driver information method in a motor vehicle, wherein an image of the surrounding area is captured by at least one side camera attached to the motor vehicle, the image containing an image capturing area that lies essentially laterally relative to the motor vehicle. A display unit, which is visible to the driver of a motor vehicle, outputs a screen image that contains a reproduction of the image of the surrounding area, the reproduction being graphically processed, if desired, and being preferably in essence photo-realistic. The output of the screen image is only temporary. An obstructed view situation, in which an obstructed lateral view of the driver is to be assumed, is detected on the basis of distance signals of at least one environment detection system that is not based on a camera. The output of the screen image is automatically started when an obstructed view situation is detected.

According to the invention, at least the output of the screen image is only temporary, but can be started automatically. This occurs upon detecting an obstructed view situation, in which an obstructed lateral view of the driver is to be assumed. Such an obstructed view situation is detected on the basis of distance signals of at least one environment detection system that is not based on a camera.

The inclusion of distance signals of at least one environment detection system that is not based on a camera increases the robustness of the entire method.

In addition, the use of distance signals of at least one environment detection system that is not based on a camera makes possible the multiple use of motor vehicle components that are not based on a camera, for example, a parking assistance system that is typically available in modern motor vehicles.

The environment detection system that is not based on a camera may be configured, in particular, as an ultrasonic-based parking assistance system (for example, a parking distance control (PDC) in vehicles of the assignee). In particular, it is advantageous to detect and classify by means of such a system obstacles in the surrounding area of the motor vehicle (for example, moving vs. non-moving) and to make the detection of an obstructed view situation dependent on whether at least one obstacle of a certain class (for example, non-moving) is present, and whether this at least one obstacle is located in a certain position relative to the motor vehicle. For example, it can be checked whether a "constant"—that is, non-moving—obstacle is located in front of the vehicle and/or whether a non-moving obstacle is located laterally on the left and/or laterally on the right of the vehicle and/or whether even on the left and the right there is at least one non-moving obstacle.

The activation of the output of the screen image remains limited by the invention to such situations in which the side view system is capable of providing the driver with especially useful assistance. In all other situations, the driver is not distracted from the task of driving through the output of the screen image.

In practical applications a side view system is used with increasing frequency with the use of the invention and provides additional safety for the driver. The automatic or, more specifically, self-acting activation takes the strain off the driver in potentially critical driving situations so that the driver can concentrate on other tasks.

According to a preferred embodiment of the present invention, the capturing of the image of the surrounding area is also only temporary. It can also be started, in particular, only upon detection of the obstructed view situation; or more specifically it is not started until the obstructed view situation has been detected.

As an alternative, the image of the surrounding area can be captured continuously—to some extent in the background—without the output of a screen image. It is also just as possible to start the capturing of the image of the surrounding area at an earlier stage than the output of the screen image. For example, the capturing of the image of the surrounding area can be linked to a smaller number of criteria and/or fewer requirements than the output of the screen image. This approach makes it possible for the images of the surrounding area to already be on hand when, finally, a screen image is supposed to be displayed. This approach also makes it possible to achieve, if desired, that the image processing of the images of the surrounding area is able to deliver results as early as the time when, finally, a screen image is supposed to be displayed.

According to a preferred embodiment of the invention, the detection of the obstructed view situation is based additionally on the results of an image processing of the image of the surrounding area of at least one side camera. In particular, this image processing can include a motion-stereo vision method.

According to an additional preferred embodiment of the invention, the detection of the obstructed view situation is based additionally on the results of a determination of the driving speed of the motor vehicle. In particular, it can be checked whether the driving speed falls below a certain specified value—that is, the vehicle is moving slowly. As an alternative or in addition, it can be checked whether the vehicle has reached a standstill.

According to an additional preferred embodiment of the invention, the detection of the obstructed view situation is based additionally on the results of a determination of the steering angle of the motor vehicle. In particular, it can be checked whether the steering angle falls below a certain specified absolute value.

According to an additional preferred embodiment of the invention, the detection of the obstructed view situation is based additionally on the results of a determination of the gear selection of the motor vehicle. In particular, it can be checked whether a forward gear of the vehicle is engaged.

According to an additional preferred embodiment of the invention, the detection of the obstructed view situation is based additionally on the results of a determination of the geographical position of the motor vehicle. In particular, it can be checked whether the motor vehicle is in the vicinity of an intersection, on a multi-lane road, on private grounds and/or on a public road.

In principle, an automatic activation of the output can also be carried out (omitting the inventive feature that an obstructed view situation, in which an obstructed lateral view of the driver is to be assumed, is detected on the basis of distance signals of at least one environment detection system that is not based on a camera) solely on the basis of the results of a determination of the geographical position of the motor vehicle.

According to an additional preferred embodiment of the invention, the detection of the obstructed view situation is based additionally on the results of a determination of the time that has passed since the engine of the motor vehicle was started. In particular, it can be checked whether the engine of the vehicle was started within a defined past timespan and/or whether in this timespan a start/stop button of the motor vehicle was actuated.

According to an additional preferred embodiment of the invention, the detection of the obstructed view situation is based additionally on the results of a determination of a brake application.

According to an additional preferred embodiment of the invention, the detection of the obstructed view situation is based additionally on the results of a determination of the activation state of a driving direction indicator (turn signal blinker) of the motor vehicle.

According to an additional preferred embodiment of the invention, the detection of the obstructed view situation is based additionally on the results of a determination of the lighting situation in the environment of the motor vehicle.

According to an additional preferred embodiment of the invention, the output of the screen image can also be started manually, for example, by a key stroke or by selecting a menu option from a menu structure.

According to an additional preferred embodiment of the invention, the current traffic situation is analyzed based on image processing, in order to activate the output of the screen image only as required.

According to an additional preferred embodiment of the invention, the output of the screen image is also automatically started, when the motor vehicle has reached one of several predefined geographic positions. For this purpose the system creates, for example, a history of so-called geotags, at which the output has usually been started by hand in the past. This feature makes it possible to make a hypothesis about when the output is usually required or, more particularly, desired by the driver. In addition, the driver is given the option of explicitly storing or erasing a geotag, in order "to train" his system. The storage could be requested, for example, by a long key stroke. The geotags serving as activation positions could also be stored by the individual user in the vehicle, so that a user, who is identified by a certain vehicle key, can have recourse to his personal geotags.

According to an additional preferred embodiment of the invention, the output of the screen image is also automatically started, when it is detected by means of a determination of the vehicle's own position and by means of the map data of a navigation system that the motor vehicle is located at an intersection of a road (for example, approaching an intersection), at which the output seems to be useful. In the event that a GPS signal is not available, such as in an underground garage, an appropriate activation situation can still be detected, if desired, by an analysis of the conditions of the surrounding area (lighting of the surrounding area, video data of cameras, PDC, etc.) and the state of the vehicle (engine start, speed, blinker state, etc.).

A combined evaluation of several information sources (for example, two, three or four information sources from the set of sources: geotag history, map data, image processing, vehicle states) and the linking of an automatic start of the output of the screen image to the results of the evaluation would be especially advantageous.

Given an intelligent evaluation, it is possible to achieve an automatic, requirement-oriented activation of the output in such a way that this activation does not appear to the driver to be too "intrusive." In the extreme case it is even possible to dispense with the operator control means for a manual activation (for example, push buttons).

Preferably, certain characteristic activation situations are defined for an automatic activation of the output of the screen image; and these situations are distinguished by the complete (optionally also only predominant) fulfillment of specific predefined conditions, in particular, based on one or more of the information sources: map data, image processing, vehicle states.

According to a preferred embodiment of the invention, at least one such characteristic activation situation involves the case of driving out of a parallel parking space by means of a forward motion.

According to an additional preferred embodiment of the invention, at least one such characteristic activation situation involves the case of driving through a narrow parking garage exit by means of a forward motion.

According to a preferred embodiment of the invention, at least one such characteristic activation situation involves the case of turning into or out of a side street with obstructed view.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic drawing of a side view system with two side cameras.

DETAILED DESCRIPTION OF THE DRAWING

The following description is based on the example of a motor vehicle that is equipped with a side view system comprising two side cameras that are positioned on the left and the right on the front bumpers of the motor vehicle and oriented orthogonal to the direction of travel. The two video images (images of the surrounding area) that are captured by these side cameras are collected by a control unit of the motor vehicle and jointly prepared, or more specifically, processed to form a screen image (cf. rectangle 1 in FIG. 1). The screen image can also show distance marks by augmentation, for example, according to the teaching of DE 10 2007 024 752 A1. The drawing shows the screen image 1 in the Central Information Display (CID) of the motor vehicle.

The screen image 1 includes (with a slightly distorted perspective for the sake of a better orientation of the driver) screen images 2 and 3 of the surrounding area; and each of these screen images 2, 3 matches in essence the image of the surrounding area captured by a side camera. A display panel 4, arranged centrally between the screen images 2 and 3 of the surrounding area, shows an image 7 of the motor vehicle as two virtual screen objects 5 and 6 of the area. The image and the screen objects 5 and 6 of the area show the observer how the image capturing areas of the images of the surrounding area are arranged relative to the motor vehicle.

The output of the screen image on the CID can be activated by the driver of the motor vehicle by the stroke of a key or by selecting an appropriate menu option in a menu structure. When a specified value of the driving speed is exceeded, the output is automatically terminated or, more specifically, disabled.

Since it is necessary to stroke a key or select an appropriate menu option, the situation may arise that the function is not available in many situations, in which it would be very useful—for example, because the driver cannot find the time to activate it.

In order to solve this problem, the exemplary system has the possibility of an automatic system activation at defined positions, in certain situations and/or under certain conditions.

The following described characteristic activation situations are defined, in particular, for an automatic activation of the output of the screen image, preferably without the evaluation of so-called geotags. In this case, the required data for the necessary interpretation of the environment are provided by an ultrasonic-based parking assistance system (for example, PDC/PMA), a navigation system and/or an image processing with motion-stereo vision method and existing CAN messages. The described course of action to be taken makes, to some extent, high (not specified in detail herein) demands on the accuracy of the navigation localization and/or the coverage and range of PDC/PMA and image processing (motion-stereo vision), but these demands are considered to have been met in the following description.

A first characteristic activation situation represents the case of driving out of a parallel parking space with a forward motion of the vehicle. This activation situation is detected when the following conditions are completely (optionally, also only predominantly) met:

a) starting the engine with the start/stop button (within a specified time span);

b) engaging a forward gear/step D (within a specified timespan);

c) detection by use of PDC/PMA of at least one "constant" (that is, non-moving) obstacle/object in the immediate vicinity laterally on the left and laterally on the right relative to the motor vehicle (an obstacle/object on only one side significantly reduces the probability of the presence of a transverse/diagonal parking situation);

d) front obstacle detection by use of PDC/PMA "no front obstacle, path of travel open"; and e) vehicle's own position off the road of a certain category (in order to avoid mis-activation at intersections or in congested traffic, in particular, no intersection, no multi-lane road).

The use of motion-stereo-vision-based image processing methods for detecting blind spots is not possible in connection with this first characteristic activation situation, especially if an activation is supposed to occur as early as in a standstill state.

A second characteristic activation situation represents the case of driving through a narrow parking garage exit with a forward motion of the vehicle. This activation situation is detected when the following conditions are completely (optionally, also only predominantly) met:

a) slow travel (low accelerator pedal position and/or speed less than a specified value v_slow);

b) optionally, after a previous vehicle standstill: brake application;

c) driving approximately straight ahead (small steering angle);

d) front obstacle detection by use of PDC/PMA "no front obstacle, path of travel open";

e) detection by use of PDC/PMA of at least one "constant" (that is, non-moving) obstacle/object in the immediate vicinity laterally on the left and laterally on the right relative to the motor vehicle;

f) vehicle's own position off the road of a certain category (in order to avoid mis-activation at intersections or in congested traffic, in particular, no intersection, no multi-lane road, preferably position on private grounds or parking space—that is, not (yet) on a public road); and g) detection of a change or, more specifically a transition, from the detection of obstacles/objects (on the left and right) to the detection of free space (on the left and right) by use of PDC/PMA and/or by means of image processing with motion-stereo vision method.

A third characteristic activation situation represents the case of turning into or turning out of a side road with an obstructed view. This activation situation is detected when the following conditions are completely (optionally, also only predominantly) met:

a) slow travel (low accelerator pedal position and/or speed less than a specified value v_slow);

b) optionally, after a previous vehicle standstill: brake application;

c) driving approximately straight ahead (small steering angle);

d) front obstacle detection by use of PDC/PMA "no front obstacle, path of travel open";

e) detection by use of PDC/PMA of at least one "constant" (that is, non-moving) obstacle/object in the immediate vicinity laterally on the left and laterally on the right relative to the motor vehicle;

f) vehicle's own position off the road of a certain category (in order to avoid mis-activation at intersections or in congested traffic, here in particular, vehicle's own position at single lane intersections in residential areas); and g) detection of a change or, more specifically a transition, from the detection of obstacles/objects (on the left and right) to the detection of free space (on the left and right) by use of PDC/PMA and/or by means of image processing with motion-stereo vision method (preferred due to higher range).

In order to safeguard against mis-activation, it is also possible to include an additional active triggering by the driver—for example, by braking or short term vehicle standstill—before the activation time. A suitable combination of an environment detection and the behavior of the driver can increase the rate of detection and, at the same time, decrease the rate of mis-detection for the purpose of a (semi) automatic activation without a key stroke.

It must be pointed out that the definition of the above-described characteristic activation situations for an automatic activation of the output of the screen image is also advantageous in connection with other types of detection of at least one image of the surrounding area and in connection with other types of processing and presentation of the screen image.

The above description is based—influenced by the predominant orientation of the prior art—without loss of generality on a side view system with side cameras arranged in the front area of the vehicle as well as on an automatic activation in the event of "driving out of a parking space with a forward motion" and/or "driving through with a forward motion", etc. However, the invention can also be transferred and/or applied to an automatic activation of the output of a screen image in a side view system with side cameras, which are arranged in the rear area of the motor vehicle and/or, for example, in the event of driving out of a parking space with a rearwards motion.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of providing information to a driver of a motor vehicle, the motor vehicle being equipped with at least one side camera attached to a first side of the motor vehicle for capturing an image of an image capturing area lying laterally to said first side of the motor vehicle, and a display unit visible to the driver on which a screen image is output that is a reproduction of the image of the image capturing area, the method comprising the acts of:

detecting that an obstacle is present laterally to said first side of the motor vehicle, wherein said detecting is based on distance signals of at least one environment detection system, the environment detection system not being a camera-based system;

determining from the obstacle's detected presence that the obstacle is causing an obstructed lateral view situation in which a lateral view of the driver to said first side of the motor vehicle is obstructed; and in response to determining the obstructed lateral view situation, starting automatically an output of the screen image upon detecting the obstructed lateral view situation such that the output of the screen image is only temporary, wherein the screen image is a reproduction of the image capturing area provided by the at least one side camera attached to the first side of the motor vehicle.

2. The method according to claim 1, further comprising the act of:

only temporarily capturing the image of the image capturing area; and upon detecting of the obstructed lateral view situation, starting the temporary capturing of the image of the image capturing area.

3. The method according to claim 1, wherein the detecting of the obstructed lateral view situation is based additionally on a result of an image processing of the image of the image capturing area of at least one side camera.

4. The method according to claim 2, wherein the detecting of the obstructed lateral view situation is based additionally on a result of an image processing of the image of the image capturing area of at least one side camera.

5. The method according to claim 3, wherein the image processing of the image uses a motion-stereo vision method of image processing.

6. The method according to claim 1, wherein the detecting of the obstructed lateral view situation is based additionally on a result of a determination of a driving speed of the motor vehicle.

7. The method according to claim 1, wherein the detecting of the obstructed lateral view situation is based additionally on a result of a determination of steering angle of the motor vehicle.

8. The method according to claim 6, wherein the detecting of the obstructed lateral view situation is based additionally on a result of a determination of steering angle of the motor vehicle.

9. The method according to claim 1, wherein the detecting of the obstructed lateral view situation is based additionally on a result of a determination of a gear selection of the motor vehicle.

10. The method according to claim 8, wherein the detecting of the obstructed lateral view situation is based additionally on a result of a determination of a gear selection of the motor vehicle.

11. The method according to claim 1, wherein the detecting of the obstructed lateral view situation is based additionally on a result of a determination of a geographical position of the motor vehicle.

12. The method according to claim 10, wherein the detecting of the obstructed lateral view situation is based additionally on a result of a determination of a geographical position of the motor vehicle.

13. The method according to claim 1, wherein the at least one environment detection system that is not a camera-based system comprises an ultrasonic-based parking assistance system.

14. The method according to claim 2, wherein the at least one environment detection system that is not a camera-based system comprises an ultrasonic-based parking assistance system.

15. The method according to claim 1, further comprising the acts of:
   detecting obstacles in a surrounding area of the motor vehicle and classifying said obstacles via the environment detection system that is not a camera-based system; and
   wherein the detecting of the obstructed lateral view situation is based on a result of a determination of a presence of at least one obstacle of a certain class and its position relative to the motor vehicle.

16. The method according to claim 2, further comprising the acts of:
   detecting obstacles in a surrounding area of the motor vehicle and classifying said obstacles via the environment detection system that is not a camera-based system; and
   wherein the detecting of the obstructed lateral view situation is based on a result of a determination of a presence of at least one obstacle of a certain class and its position relative to the motor vehicle.

17. The method according to claim 1, wherein the reproduction is essentially photo-realistic.

18. The method according to claim 1, wherein the reproduction is graphically processed and is essentially photo-realistic.

19. The method of claim 1, wherein the image capturing area extends in a direction that is substantially orthogonal to the motor vehicle.

* * * * *